United States Patent
Willrett

(10) Patent No.: US 6,763,103 B1
(45) Date of Patent: Jul. 13, 2004

(54) METHOD AND ARRANGEMENT FOR NETWIDE CALL TRACE IN A TELECOMMUNICATION NETWORK

(75) Inventor: Ursel Willrett, Gerlingen (DE)

(73) Assignee: Wavetek Wandel Goltermann Eningen GmbH & Co. (DE)

( * ) Notice: Subject to any disclaimer, the term of this patent is extended or adjusted under 35 U.S.C. 154(b) by 0 days.

(21) Appl. No.: 09/524,167

(22) Filed: Mar. 13, 2000

(30) Foreign Application Priority Data

Mar. 27, 1999 (EP) ............................................ 99106403

(51) Int. Cl.$^7$ ................................................ H04M 7/00
(52) U.S. Cl. ................ 379/229; 379/32.01; 379/32.03; 379/32.05; 379/221.08; 379/230
(58) Field of Search ............................ 379/32.01, 32.03, 379/133, 219, 220.01, 221.08, 229, 230, 32.05

(56) References Cited

U.S. PATENT DOCUMENTS

| | | | |
|---|---|---|---|
| 5,438,570 A | | 8/1995 | Karras et al. |
| 5,475,732 A | | 12/1995 | Pester, III |
| 5,754,634 A | * | 5/1998 | Kay et al. ............... 379/112.01 |
| 5,896,445 A | * | 4/1999 | Kay et al. ................... 379/135 |
| 5,930,344 A | * | 7/1999 | Relyea et al. ............... 379/126 |
| 6,009,321 A | * | 12/1999 | Wang et al. ................. 455/410 |
| 6,072,857 A | * | 6/2000 | Venkateshwaran et al. .... 379/9 |
| 6,137,876 A | * | 10/2000 | Wong et al. ................. 379/246 |

FOREIGN PATENT DOCUMENTS

| | | |
|---|---|---|
| WO | 9616516 | 5/1996 |
| WO | 9712473 | 4/1997 |

OTHER PUBLICATIONS

Fingerle B–M: "GSM Signalisierung in Der Praxis", ITG–Fachberichte, No. 124, Sep. 1, 1993, pp. 423–432.

* cited by examiner

*Primary Examiner*—Bing Bui
(74) *Attorney, Agent, or Firm*—Reed Smith, LLP

(57) ABSTRACT

The invention refers to a method and an arrangement for netwide call trace with various interfaces and protocol stacks of at least one call within a telecommunication network by using a central call trace server (CS) and local intelligent call trace intelligent agents (IA) between the switching points (SP) of the telecommunication network, said central call trace server being connected with all of said local intelligent call trace intelligent agents IA. The central server manages the intelligent agents and distributes information between the intelligent agents. Only a reduced set of necessary data are sent to the central server by the intelligent agents, in case that the central server requires more data this data are sent by the intelligent agents upon request of the central server. The method and the arrangement allows an exact call trace inclusive of wild cards and calls between different telephone networks (mobile/land).

26 Claims, 10 Drawing Sheets

METHOD AND ARRANGEMENT FOR NETWIDE CALL TRACE IN A TELECOMMUNICATION NETWORK

BACKGROUND OF THE INVENTION

The invention refers to a method and an arrangement for netwide call trace with various interfaces and protocol stacks of at least one call within a telecommunication network.

Intelligent telecommunication networks include networks for mobile communication being connected to fixed telephone networks. This is described in detail for example in the book "Mobilfunk und Intelligente Netze" by Jacek Biala, Vieweg Verlag, Braunschweig/Wiesbaden, Germany 1996, ISBN 3-528-153024, and in respective standards and recommendations of international organizations as for example ITU (International Telecommunications Union) or others also mentioned in the above referenced book.

A Global System for Mobile Communication GSM is connected via a Gateway Mobile Services Switching Center GMSC to, for example, Public Switched Telephone Network PSTN, Public Land Mobile Network, Integrated Services Digital Network ISDN, Packet Switched Public Data Network PSPDN or other mobile networks as for example D1, D2 or E1 Networks in Germany. A PSTN comprises several switching which are connected with each other in or to build up connection between an optional number of users located at an optional number of geographical places within the network. The GSM comprises a Switching Subsystem SSS performs the call management as well as the subscriber adminstration. For this, the SSS includes a Home Location Register HLR, a Visitor Location Register VLR, an Equipment Identification Register EIR and an Authentication Center AC all being connected to an Mobile Services Switching Center MSC. Within one GSM there are many MSC connected with the allocated HLR, VLR, EIR and AC. Between the main components exist standardized interfaces also mentioned in the above referenced book and international standards and well know to a person skilled in the art.

For the network operator it is necessary to get knowledge of mistakes in the transmission path independent of the endpoints of the call. Up to now there exists no possibilty for a netwide trace call.

SUMMARY OF THE INVENTION

It is therefore the object of the invention to provide a possibility to perform a netwide trace call. This object is solved by a method and an arrangement according to the invention.

The method according to the invention comprises the following steps:
  activating the intelligent agents IA by the central server (CS) together with a message comprising the a trigger (TN) to be call traced;
  comparing the trigger number (TN) with the contents of the call establish messages of the calls running on the signalling channel (SC) by the intelligent agents (IA) and sending an establish message to the central server (CS) by those intelligent agents IA which have matched with the trigger number together with additional information (RL) about the detected connection between two switching points (SP) as well as at least the identification number of the intelligent IA;
  sorting the messages and information (RL) by the central server (CS) sent by the intelligent agents (IA), removing redundant information and allocating the information to the respective section belonging to two switching points (SP) being connected together;
  tracing all signalling data belonging to the detected call by the intelligent agents (IA) being involved in view of the matching of the trigger (TN);
  detecting the call terminating by at least one of said intelligent agents (IA) and sending a call termination message to the central server (CS), forwarding of the message concerning the call termination to all the other intelligent agents (IA) being involved in the call trace; and
  transmitting the recorded data to the central server (CS) and displaying of the data by the central server (CS) dependent on the different transmission layers in the telecommunication network.

The arrangement according to the invention for net wide call trace of at least one call within a telecommunication network comprises a central call trace server (CS) and local call trace intelligent agents (IA) between the switching points (SP) of the telecommunication network, said central call trace server (CS) being connected with all of said local call trace intelligent agents (IA) and comprising a call trace managing means with a call trace graphical user interface (GUI) and an interface connected to said intelligent agents (IA), and said intelligent agents (IA) comprise an interface to the central server (CS) and an intelligent call trace unit (IU). The central server (CS) and intelligent agents (IA) are adapted to communicate with each other and to perform the following operations:
  activating the intelligent agents IA by the central server (CS) together with a message comprising the a trigger number (TN) to be call traced;
  comparing of the trigger number (TN) with the call establish messages the calls running on the signalling channel (SC) by the intelligent agents (IA) and sending an establish message to the central server (CS) by those intelligent agents IA which have matched with the trigger number together with additional information (RL) about the detected connection between two switching points (SP) as well as at least the identification number of the intelligent agent IA;
  sorting the messages and information (RL) by the central server (CS) sent by the intelligent agents (IA), removing redundant information and allocating of the information to the respective section belonging to two switching points (SP) being connected together;
  tracing all signalling data of the signalling channel (SC) by the intelligent agents (IA) being involved in view of the matching of the trigger number (TN) and transmitting the call relevant data to the central server (CS);
  detecting the call terminating by at least one of said intelligent agents (IA) and sending a respective message to the central server (CS), forwarding the message concerning the call termination to all the other intelligent agents (IA) being involved in the call trace; and
  transmitting the signaling data of the call from the intelligent agents (IA) to the central server (CS) and displaying the stored data by the central server (CS) dependent on the different transmission layers in the telecommunication network.

According to one important feature of the invention only a reduced set of necessary data are sent to the central server by the intelligent agents. In case that the central server requires more data, e.g. for enhanced result presentation, these data are sent by the intelligent agents upon request of the central server. This avoids the sending of unnecessary information and overload of the central server.

BRIEF DESCRIPTION OF THE DRAWINGS

In the following the invention together with further advantages and objects is explained in detail in connection with the drawings, in which.

DETAILED DESCRIPTION OF PREFERRED EMBODIMENTS

In the following description and in the text above the following abbreviations are used:

ACM Address Clompete Message
ANM Answer Message
CIC Circuit Identification Code
CPG Call Progress
CS Central Server
DPC Destination Point Code
EDSS1 Euro Digital Signaling System 1
EIR Equipment Identification Register
GMSC Gateway MSC
GSM Global System for Mobile Communication
GUI Graphical User Interface
HLR Home Location Register
IA Intelligent Agent
IAM Initial Address Message
ID Identification
IMEI International Mobile Equipment Identity
IMSI International Mobile Subscriber Identity
IN Intelligent Network
INAP Intelligent Network Application Part
ISUP ISDN User Part
MAP Mobile Application Part
MSC Mobile Services Switching Centre
MSISDN Mobile Station ISDN number
MSRN Mobile Station Roaming Number
MTP Message Transfer Part
NI Network Indicator
O&M Operation and Maintenance
OPC Originating Point Code
PCM Pulse Code Modulation
PLMN Public Land Mobile Network
PSTN Public Switched Telephone Network
SAM Subsequent Addresws Message
SCCP Signaling Connection Control Part
EP Signaling End Point
SI Service Indicator
SIO Service Information Octet
SP Switching Point
SPC Signaling Point Code
SSN Subsystem Number
STP Signaling Transfer Point
SS#7 Signaling System Number 7
TCAP Transaction Capability Application Part
TMSI Temporary Mobile Subscriber Identity
TN Trigger Number
REL Release Message
VLR Visitor Location Register
VMSC Visitor MSC Related Standards Q.767 CCITT Specification of ISDN User Part (Blue Book)
Q.701–704, Q.706, Q707 CCITT Spec. on SS #7 MTP (Blue Book)
Q.711–714, Q.716 CCITT Spec. on SS #7 SCCP (Blue Book)
Q.771–774 CCITT Specification of TCAP (White Book)
GSM 08.08 BSS-MSC Layer 3 Specification
GSM 09.02 Mobile Application Part Specification
GSM 04.08 Mobile Radio Interface Layer 3 Specification
Q.1218 ITU-T Interface Recommendation for Intelligent Network CS-1
Q.931 EDSS1

Figure 1:
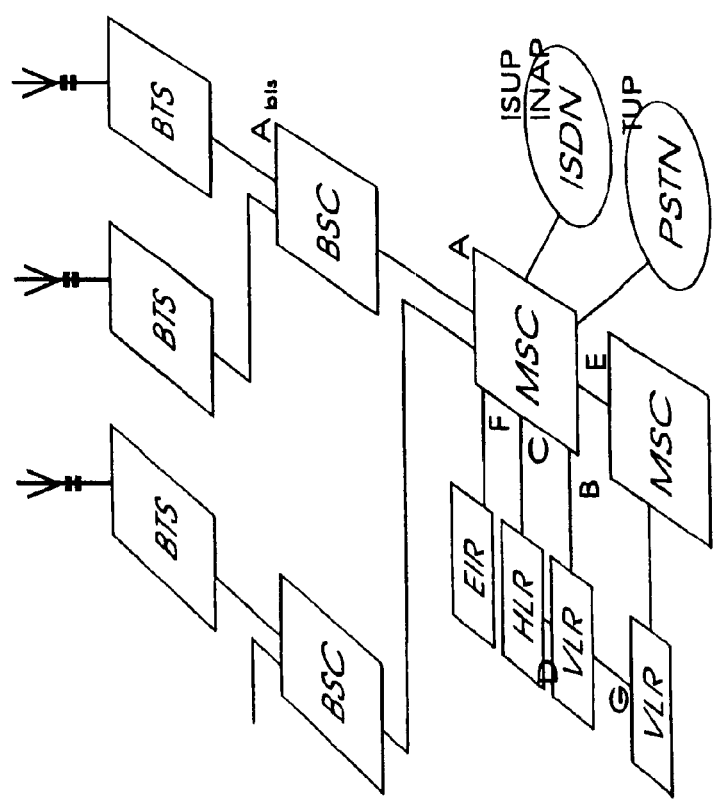
FIG. 1 shows a general overview of a telecommunication network.

FIG. 1 shows the usual and well known connections within a telecommunication network with the respective interfaces for the mobile communication. Further depicted are the different protocols being used in the respective network (ISUP, INAP). This figure depicts more detailed a mobile network, only in order to show the variety of interfaces which are involved in a call. This is also valid for each kind of network which comprises these mechanisms too.

Figure 2:
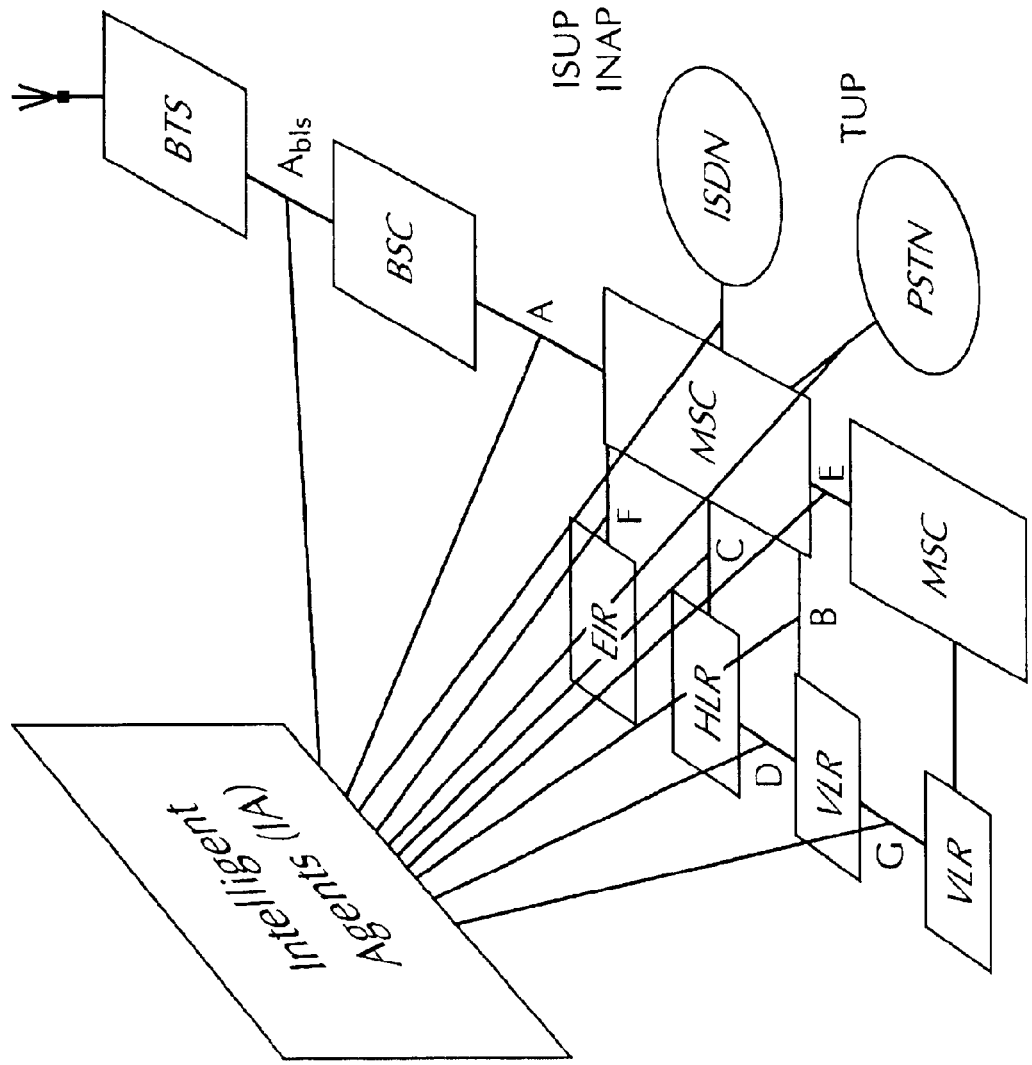
FIG. 2 shows the netwide call trace in a telecommunication network of FIG. 1.

FIG. 2 shows the connection points of the intelligent agents IA in the network of FIG. 1. The connection points are between each switching point SP between the GSM and the PSTN or ISDN as well as between the switching points SP or MSC or the components within the GSM, PSTN or ISDN. The SS#7/Mobile Surveillance System as described below consists of two main parts.

The probes for recording of signaling information and storing of these data (messages) onto hard disc. The probe consists of hardware and a frontend workstation recording messages and storing data.

Applications extracting results and presentation for surveillance, qualification and trouble shooting of SS#7/mobile networks. The applications run on different workstations (client/server concept) due to the software architecture of a distributed system. On the frontend workstation (client, probe) preprocessing and data reduction is performed. On the central work station CS (server), controlling all clients, the surveillance system and all applications are configured, the results of the applications are determined and presented to the user.

The data recording can be provided permanently. During 24 h all signaling data are recorded on all SS#7 interfaces of the network and stored on hard disc for further processing.

The world wide SS#7 network consists of an international network using as transit network and national SS#7 networks which are connected to the international SS#7 network.

Figure 3:
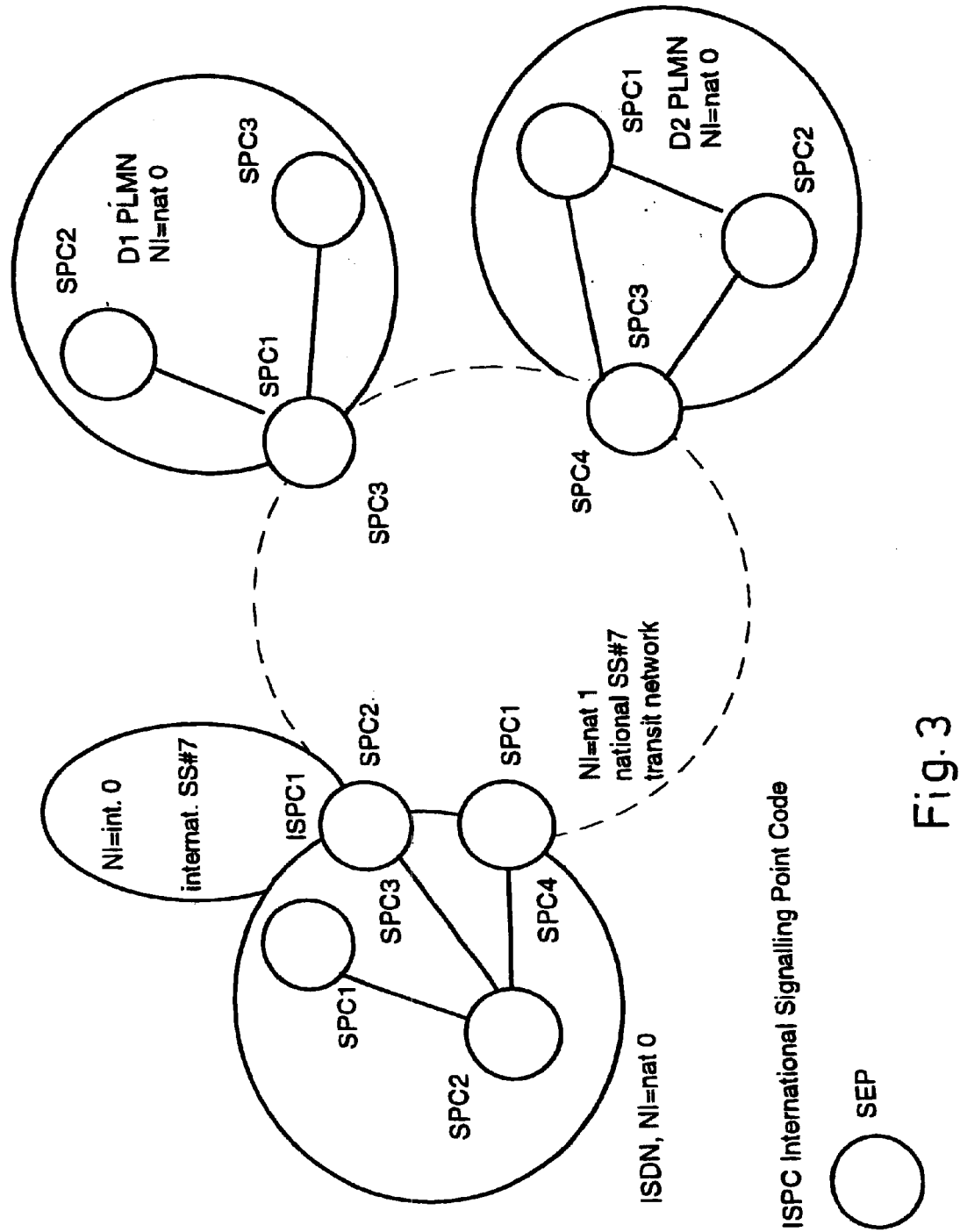
FIG. 3 is an overview of international connections.

In FIG. 3 the transit network structure in an international telecommunication structure is explained. A German transit network, for example, connects the two PLMN networks D1 and D2 to the fixed network of the German Telecom. The fixed network contains Signalling Points SPs which are connected to the international transit network.

Figure 4:
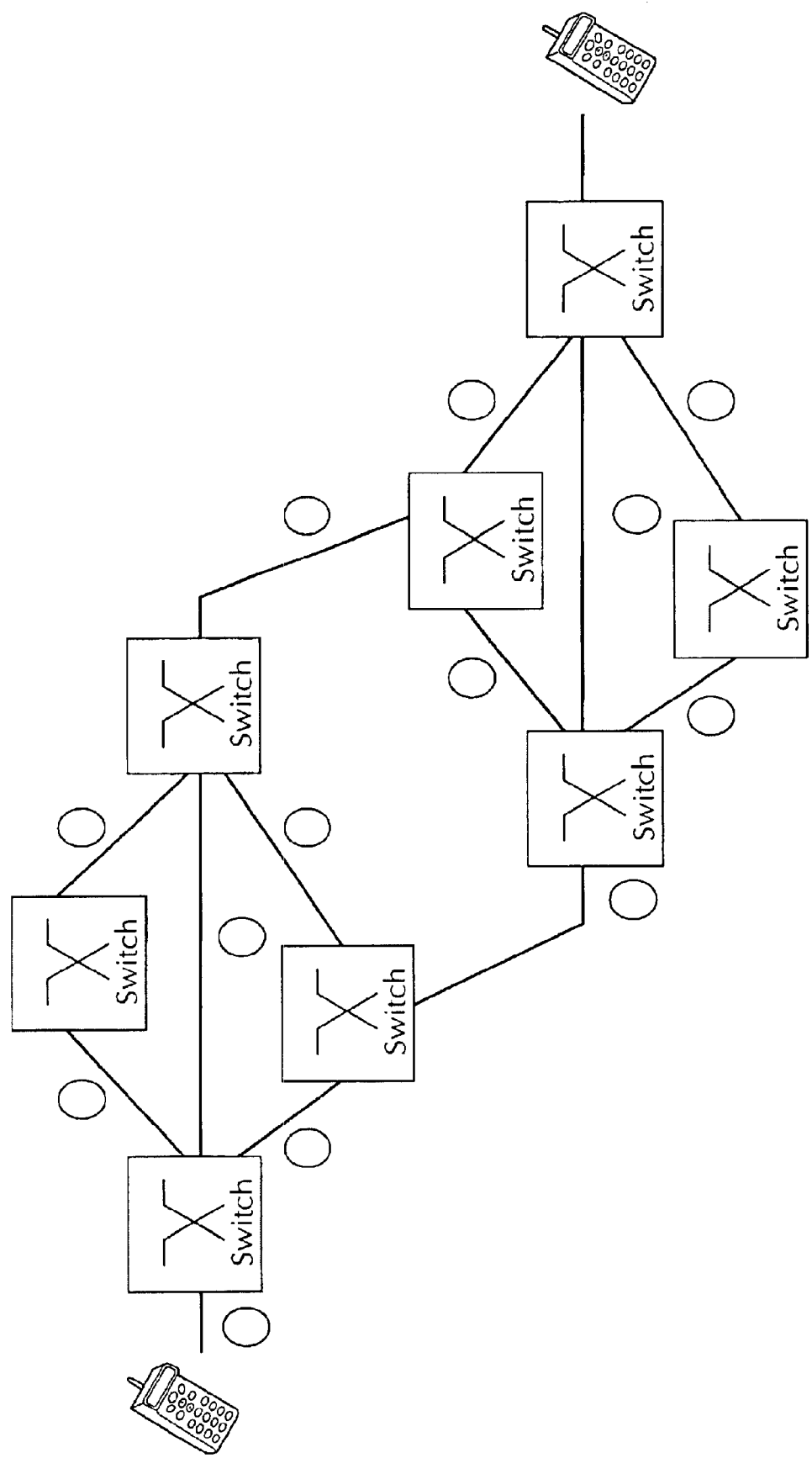
FIG. 4 depicts a general call setup.
Figure 6:
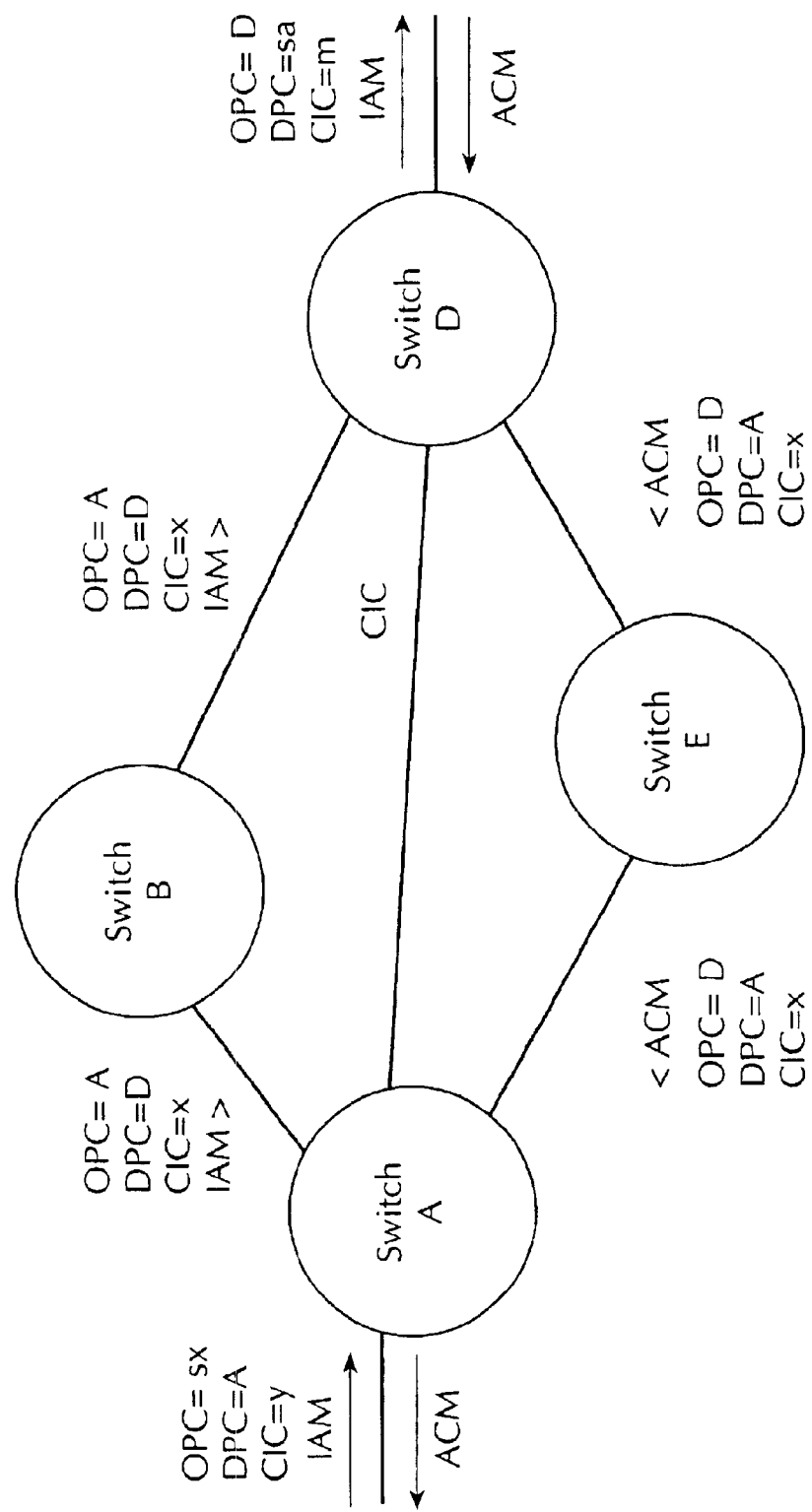
FIG. 6 the messages of a signalling end point and signalling transfer point configuration according to FIG. 5.

As shown in FIGS. 4 and 6 the telecommunication network consists of many switches SP which are identified by the signalling point code SPC. Each switch has a unique signalling point code in the network. The signalling point code is used as an address to send messages in the network from one switch to the other. The messages are sent either directly from one switch to the neighbored switch (signalling end point SEP) or via a transfer point (switch) STP to the succeeding switch. The routing label RL which identifies messages belonging to the same call consists of originating point code OPC, destination point code DCP, circuit identification point code CIC and network identifier NI. The call trace searches for messages matching the trigger TN (e.g. phone number). The following messages of the call contain the respective routing labels RL extracted from the messages transferring the phone number. It is possible that messages belonging to the call to be traced are passed via an other signalling link set as the message containing the trigger TN. Within one call many routing labels RL exist due to route the whole signalling path from one teriminal to the other. For effective call tracing it is required to optimize the communication interface between intelligent agent IA and central server CS. The central server CS sorts the incoming information and passes the data only to the relevant intelligent agents. This algorithm is necessary for performance optimization.

The central server CS transfers only those information to the intelligent agent IA which may receive further signalling messages with e.g. this routing label RL. The algorithm uses the network topology to decide which agent will receive a particular information. It depends on the different aspects of the call trace and is treated as follows:

1. Quasi Associated SS#7 Network:

The central server is informed by the agents if the trigger number has matched. The agents pass then also the detected routing labels to the central server. Routing labels are passed back to the agents which have matched the trigger number and to agents connected in the environment. Each agent acts physically between two switches identified with the point codes. A routing label is passed to an agent if either the switches with OPC or DPC or both (OPC and DPC) are connected physically to the agent.

The advantage is that the number of routing labels to be passed will be reduced by factor 50 . . . 100 compared with a full distribution of all routing labels to all connected agents IA.

2. Higher Layer Information, Intelligent Distribution of Information During the Call Trace:

Other network procedures require the intelligent distribution of higher protocol layer information, e.g.

Mobile Terminating call→Mobile Roaming Number, IMSI

Call forwarding call→forwarded number

Transfer to foreign network and back into own network→phone numbers

In case of call forwarding and mobile terminating call the intelligent agents IA in the environment of the acting switch receive the new trigger numbers (forwarded number, Mobile Roaming Number) by the central server CS. These are all agents which are connected to the acting switch. One of the physical point codes where this agent is connected to must be the point code of the acting switch. The International Mobile Subsciber Identity IMSI is transferred to the agents connected to the switches (MSC) of the GSM which are connected to a PLMN A-Interface. Also in PLMN networks the topology is used to reduce the amount of agents connected to the A-interfaces which are informed. Using the signalling link set transferring the IAM message with the Mobile Roaming number indicates the possible agents which can detect the Paging message containing IMSI.

A call is passed from the own to the foreign network via an interconnection link. In case of call forwarding back into the own network or in case of using the foreign network as a transfer medium only the call is detected once more in the own network. The signalling traffic will be found on one of the interconnection links. If a message containing the trigger number is sent via an interconnection link the connected agent IA informs the central server CS with the standard procedure that the trigger number has matched. The central server uses the network topology and detects the outgoing signalling flow. The central server informs now all agents also connected to an interconnection link with the respective routing labels RL.

Figure 5:
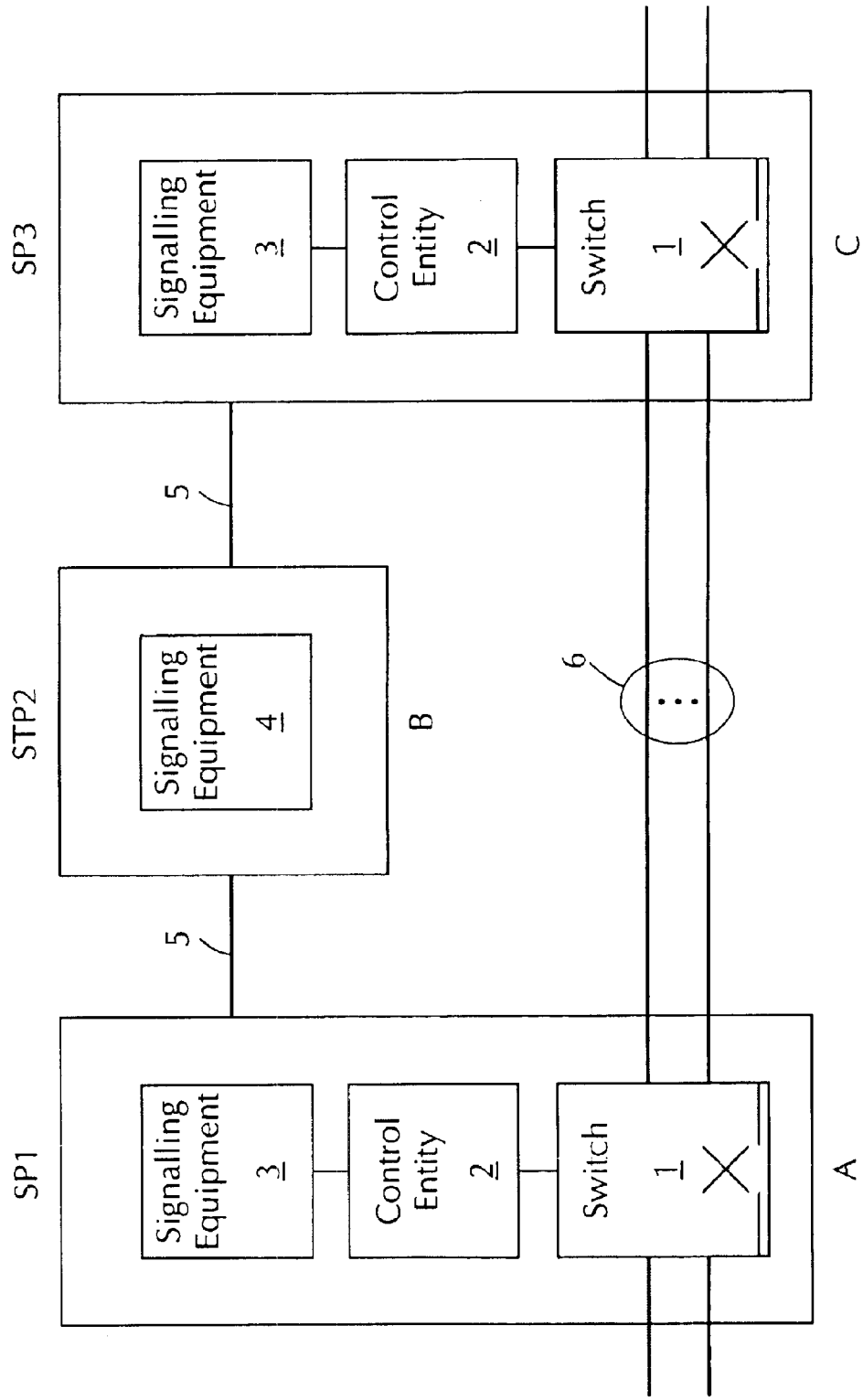
FIG. 5 a principle arrangement of a signalling end point and signalling transfer point configuration.

FIG. 5 shows another depiction of the SEP/STP configuration according to FIG. 6. The hardware of switching points SP1 and SP3 both comprise a switching equipment 1, a control entity 2 and a signalling equipment 3 being connected in series. The signalling equipments of SP1 and SP3 are both connected with the signalling equipment 4 of STP2 via signalling channel 5. STP2 only transfers the messages while SPI and SP3 which are both SEPs perform the the establishment of respective routing labels RL. The switching equipments 1 of SPI and SP3 are switched on the traffic channels 6.

Figure 7A:
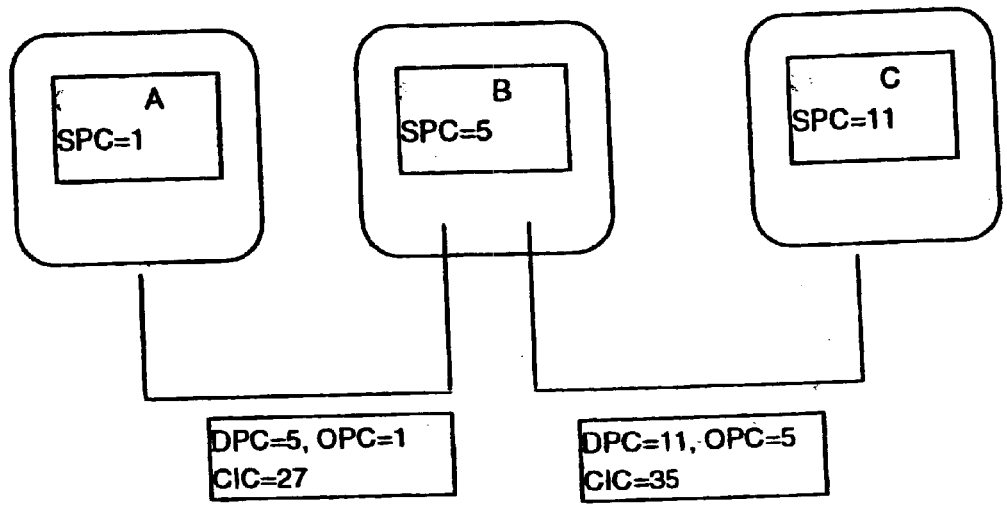
FIGS. 7a and 7b an example for a signalling end point and signalling transfer point configuration with the respective values in the messages.
Figure 7B:
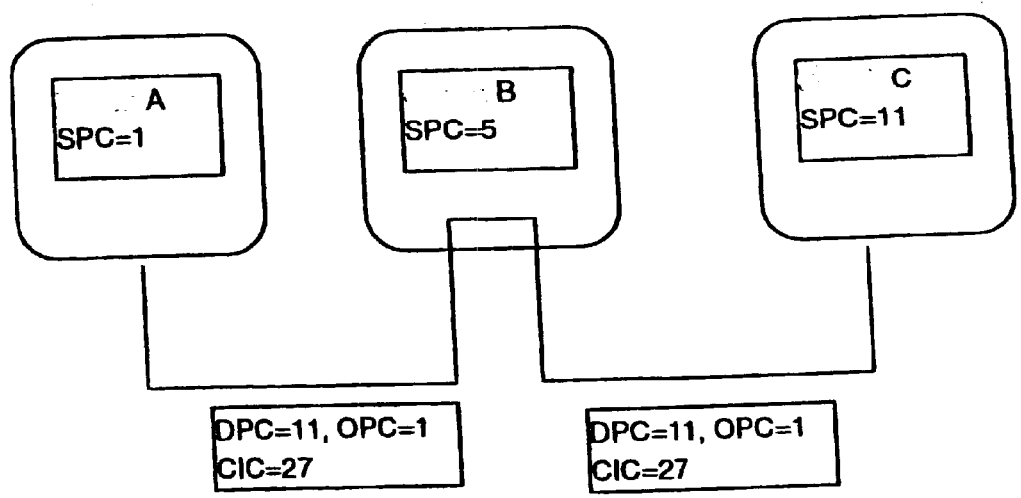

In connection with FIGS. 7a and 7b the difference between a SEP and STP is explained by way of an example based on an ISDN User Part ISUP protocol. In FIG. 7a switch B is a fully equipped switch. It detects the DPC in the incoming message which is identical to its own SPC. Switch B provides a full ISUP protocol interface using the parameters of the message for further routing. The message is sent to switch B with a different routing label. The central server CS handles the two interfaces separately and independently. The DPC/OPC pair correlates to the physical network components permanently stored in the central server CS. The call trace is based on the SPCs in the messages only. In FIG. 7b switch B is a transfer switch only. It detects the DPC in the incoming message which is not identical to its own SPC and transfers the ISUP message without checking to switch C. The routing label is not changed. The central server CS detects on both interfaces messages with the same routing label RL which are not equal to the network configuration permanently stored in CS. The physical SPC (switch A=1, switch B=5, switch C=11) differs from the OPC/DPC values in the messages. The call trace is based on the SPCs in the messages only. Therefore the difference is not relevant, except at the result presentation to distinguish between exactly the same traces from two physically different interfaces.

The call trace is performed in several phases:

Phase 1: trigger recognition.

Phase 2: collection of messages belonging to this particular call and detection of events (e.g. call forwarding).

Phase 3: call release detection or termination of the call in case of error.

Call trace description for ISUP protocol: The routing label consists of SIO which contains network indicator NI and service indicator Si, DPC and OPC. The NI together with the DPC/OPC identifies the unique point codes of the SEPs between the traced message is transferred. The central server configures its probes (intelligent agents) to the interface where it is connected to. All interfaces are configured with a pair of point codes (SPC and NI) identifying the switches connected to this particular interfaces. In case of SEPs the configured point codes are identical to the points codes in the messages monitored on this interface. In case of STPs the two points codes differ. The central server internal point code is used for identification of the probe and presentation in a Graphical User Interface (GUI). The point code sent with the signaling messages is used for the signaling specific applications. With SI different services are identified: TUP, SCCP, ISUP. CIC identifies the traffic channel used between two SEPs. Routing label and CIC is the identification of all messages belonging to the desired call. This information is extracted from the IAM messages which is the trigger number.

For the trigger of the call trace the following inputs can be given:

set of calling-Numbers (A-Number).

set of called-Numbers (B-Number).

redirecting and original number set of IMSI numbers set of TMSI numbers set of IMEI numbers A digit sequence in the IMSI, TMSI, IMEI, calling or called number can be masked with "*" (wild card, undefined number of missing digits)

service (speech, data). To avoid to much data this trigger should be used in combination with a number The application can be started once, for a fixed number of detected calls or continuously.

Start Time of the trace

If more than one number is specified (Calling-, called-, IMSI, TMSI, IMEI numbers), then a call shall be detected if one of the numbers is detected (logical "or").

For a standard trigger recognition (ISUP protocol) the following parameters are used:

1. Detection of IAM and the desired number (mostly B-number). In case of trigger A-number as the recognition may fail.
2. If the B-number is not complete the trigger recognition continues decoding the succeeding SAM messages containing the remaining digits and extract the full B-number. This number is checked against the trigger considering wild cards if any.
3. Continuously the B-number is checked versus the trigger until match.
4. The routing label and CIC of the recognized IAM is used for further message collection.
5. After trigger reception the call trace application is informed. The call trace application itself informs all other agents.

The received trigger enables the succeeding message collection phase.

If an agent receives the information that the trigger was received the pointer in the data file is reset in a previous section to ensure that all call relevant data can be found. The step back will be a time defined as a parameter for the central server which depends on the processing time.

In case of a mixed structure of SEPs and STPs it is not guaranteed that all messages follow the IAM path. It is possible that e.g. the ACM is sent via a different path. Due to there is no other parameter as routing label and CIC to sort this ACM to a previously sent IAM on an other interface the routing label and CIC are required as parameters for call establishment. The remaining problem is that the call trace does not know the dynamical usage of the switches (SEP or STP). Therefore the ACM has to be checked against every routing label/CIC values received from all IAMs found during the call trace. (Timer to get the end of LAM transmission, after expiry call establish is sent to all agents with the list of values).

By performing trigger with IAM/SAM first the IAM is checked. If the first digits in IAM match partly with the called-number trigger the called number is generated extracting all following SAMs. The called-number is complete if the called-number is equal to the predefined trigger. The frequency of SAM depends on the dialing speed of the subscriber. If the called number is fully specified for trigger a match is possible. In case of wild cards (*) the call trace compares all received digits with the defined trigger. If a match is found the call trace is proceeded as usual. If it does not match the next message received with the same routing label will stop this call trace. If the trigger contains wild card at the beginning of the number (e.g. *454) the match may be done by the received digits from succeeding SAM messages. The call trace can only performed if also the IAM is part of the collected messages, the reception of the LAM must be included in the monitored time (start time).

In the case of call forwarding trigger for the call are:

1. IAM with B-number until the switch which forwards the call (switch 2).The routing label of the IAM is used to identify all other messages of the original call.
2. The call is forwarded to the next switch (switch 3) with another number (C-number) and an other routing label. The forwarded path is handled as a new call nested with the original call. The ACM message from switch 2 to switch 1 (original path) indicates the call forwarding action.
3. The next trigger to follow up is the CPG message containing the C-Number (redirection number, which is optional) sent from switch 2 to switch 1. With this C-Number the trace at the interface-2-3 is triggered once more. Looking back in the data file the LAM(C-number) is found and all other messages are belonging to this particular call are collected using the routing label at interface-2-3.
4. Multiple call forwardings are possible indicated with the redirection counter Redirection number is optional. If this parameter is missing call trace will fail at the second interface.

Message collection concerning signaling information belonging to the particular call detected with trigger is performed using routing label and CIC. All messages of the call as ACM, ANM, CPG, . . . are collected. For the standard process no further decoding of parameters is necessary.

Triggers events on A . . . G interfaces:

| Interface | Procedure | Trigger message |
|---|---|---|
| A-interface | Mobile Originating Call | Setup (B-number) CM_Serv_Req (IMSI,TMSI) |
| A-interface | Mobile Terminating Call | Paging, Paging Response (IMSI,TMSI) |
| A-interface | Location update | Location update Request (IMSI,TMSI) IMSI Detach (IMSI,TMSI) |
| B..G Interface MAP | Mobile Terminating Call | Send routing info (MSISDN = B-number) |
| B..G Interface MAP | Mobile Terminating Call | Provide Roaming number (IMSI) |

After trigger reception all corresponding messages are found using SCCP call trace (A-interface) or TCAP call trace (B . . . G interfaces).

For standard trigger recognition the following has to be performed:
1. Detection of the establish message (s. trigger table above) and the desired number. This number is checked against the trigger considering wild cards if any.
2. The routing information of the recognized establish message is used for further message collection. The corresponding messages are searched before the trigger event (e.g. SETUP is the establish message on A-interface for MOC with the trigger event B-number, CM_SERV_REQ is sent earlier) and after the trigger event (until Disconnect).
3. After trigger reception the call trace application is informed. The call trace application itself informs all other agents necessary. In case of A-interface the standard call trace is performed on one agent only. Therefore the routing information is not distributed.

The received trigger enables the message collection phase in pre- and post trigger direction. Each agent will handle the call trace locally and passes the results directly after reception to the call trace application on the central server CS. Communication between the agents is performed via the call trace application on the central server CS only. If an agent receives the information that the trigger was received the pointer in the data file is reset in a previous section to ensure that all call relevant data can be found. The step back will be a time defined as a parameter for the call trace application which depends on the processing time (e.g. 5 sec).

In case of handover the call is already detected and has to be traced from the original network components to the destination components. The trigger is the message HO Required (A-interface) with HO cause and a list of preferred neighbor cells sent from the original BSS List of Supported Scenarios:
  Call Trace of Speech calls (including Emergency calls with or without SIM Card)
  Call Trace of Short Message Service calls
  Call Trace of Data calls
  Call Trace of automatic fax calls
  Mobile→Mobile
  Mobile→Fixed network
  Mobile⇆Intelligent network
  Mobile⇆Corporate Link (PABX—EDSS1)
  Mobile→Mailbox
  Mailbox→Mobile (Outcalling and SMS)
  Mailbox→Fixed network (Outcalling)
  SMS Service Centre⇆Mobile
  Fixed network→Mobile (HLR Interrogation)
  Fixed network→Mobile (Call Rerouting, Call Forwarding Unconditional HLR)
  Call Forwarding Mobile→Mobile (conditional Forwarding VLR—CFNRY CFNRC CFB)
  Call Forwarding Mobile→Fixed network (conditional Forwarding VLR—CFNRY CFNRC CFB)
  Call Forwarding Fixed network→Mobile (conditional Forwarding VLR—CFNRY CFNRC CFB)
  Multiple call forwarding (until max. number of call forwardings)
  Multi party calls
  Call waiting
  Call hold
  All activities regarding supplementary services are included in the call traces.

Figure 8:
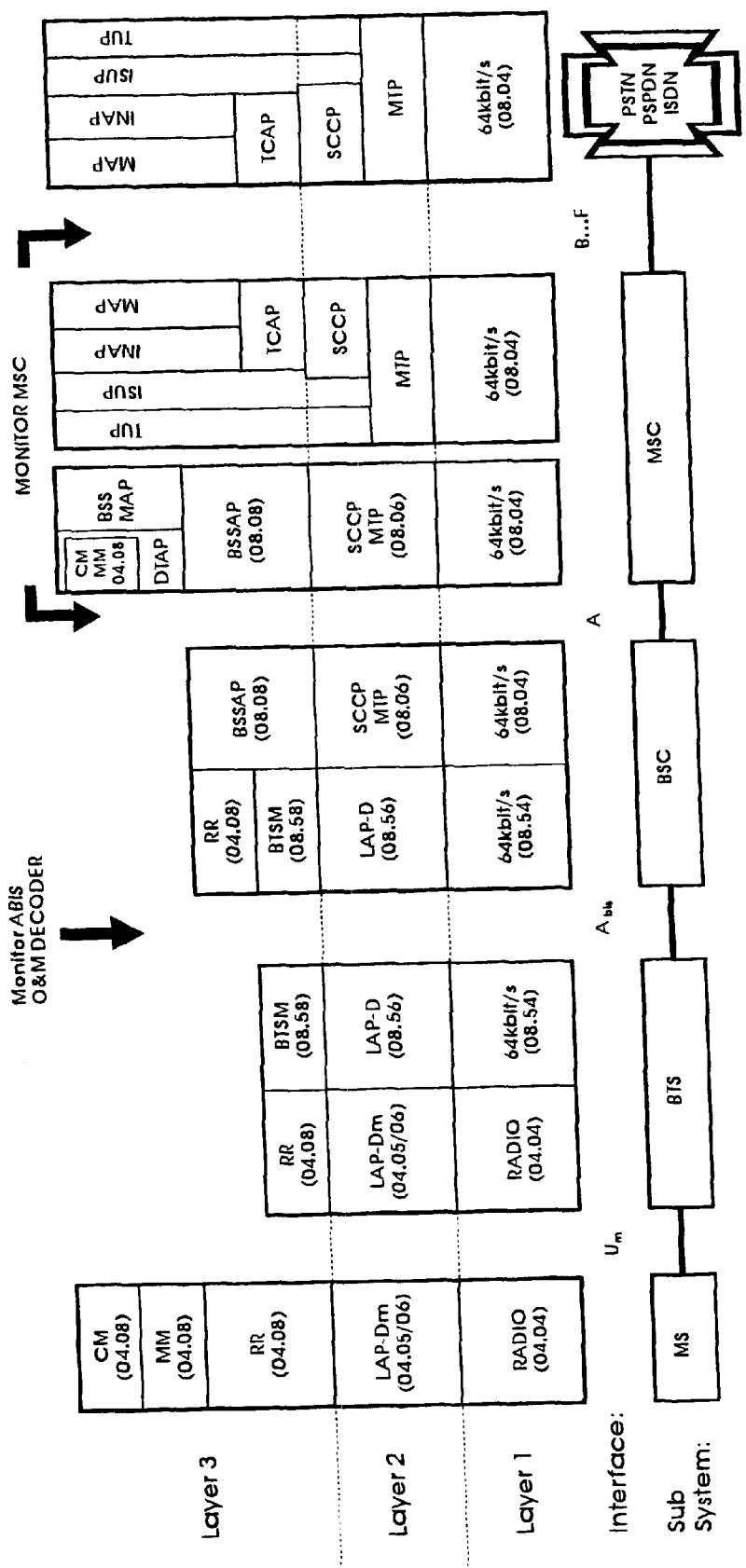
FIG. 8 the different protocol stacks which are used for the communication between the network components.

FIG. 8 depicts the different protocol stacks.

Figure 9:
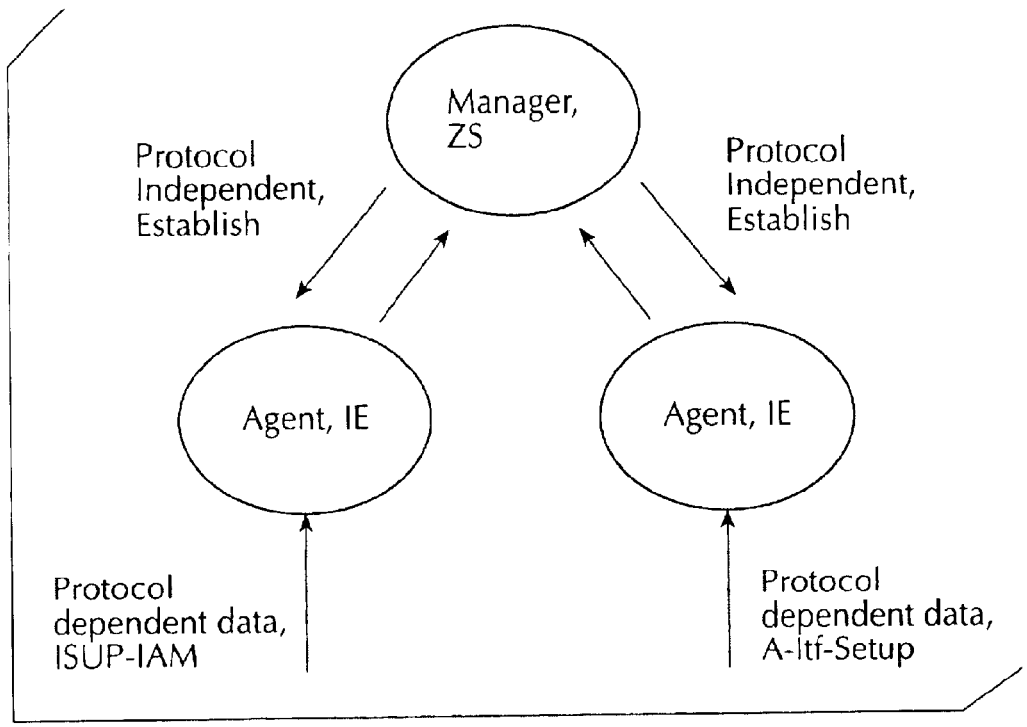
FIG. 9 a general depiction of a protocol independent communication between intelligent agent and central server.

In FIG. 9 the principle of multiple protocol stacks within one call—abstract protocol layer for communication between agent IA and central server CS is shown. A full call trace requires the interactive handling between information received from interfaces with different protocol stacks, e.g. a call trace for a mobile terminating call requires handling of SS#7-ISUP, MAP and A-interface protocol stacks. The agents decode the incoming signalling information and extract the respective information for the central server. To avoid new decoding in the central server and for effective data handling an abstraction layer is necessary which is protocol independent. The communication interface between intelligent agent and manager is protocol independent and correlates to the states of a call trace:
  Idle
  Establish IE→ZS if trigger matches
  Establish all ZS→IE containing the respective routing labels
  Traffic IE→ZS if traffic channel switched
  Terminated IE→ZS if call terminates
  Terminate all ZS→IE to stop all connected agents (IE)

The messages passed between agent and central server are independent of the actual protocol stack. This abstraction is necessary to provide a full call trace via several protocol stacks without implementation of protocol specific parts in the manager. The message interface handles all procedures described above, e.g.
  Standard call trace, ISUP
  Standard call trace, A-Interface
  Standard call trace, TCAP
  RLC/REL not received (or the equivalent messages on the other protocol stacks)
  Call forwarding, ISUP and PLMN
  Hand over For maintaining the result presentation in the different depth the interface provides messages to get the respective information to be presented (message list presentation).

This has the advantages that the central server does not need the protocol dependent information→easier program handling, the protocol information is capsulated in the intelligent agent only, abstraction of protocol dependent scenarios to call related scenarios is possible, and effective correlation of protocol dependent data belonging to the same call.

Figure 10:
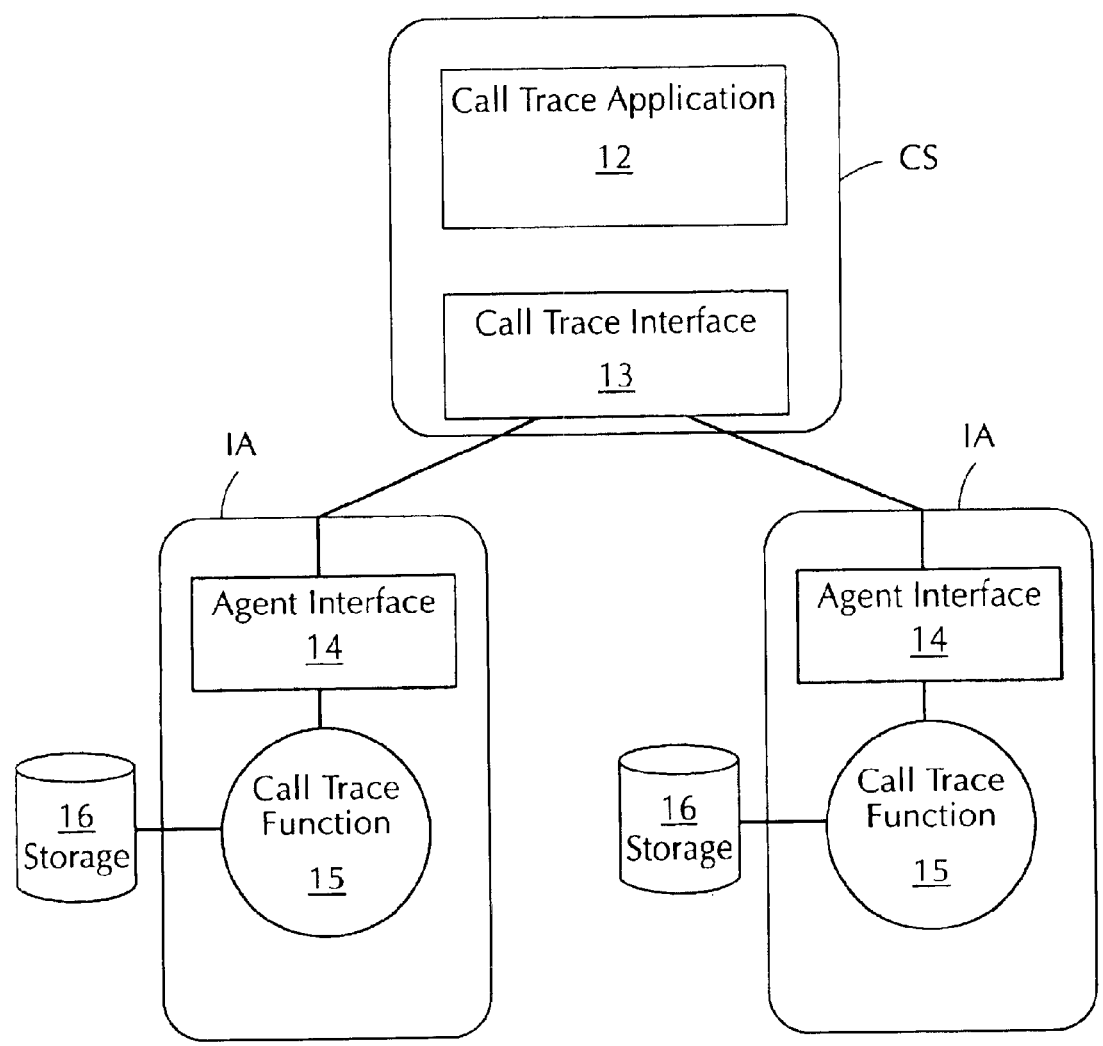
FIG. 10 the principle arrangement of the central server and the intelligent agents.

FIG. 10 shows the principle arrangement of central server CS and intelligent agents. The call trace agents IA running directly on the probe and the call trace application realised in the central server CS. The central server CS comprises the call trace application 12 and a call trace application interface 13 which communicates with the agent interface 14 of the intelligent agents IA. The agent interface 14 communicates with the call trace function 15. Data are stored in the storages 16.

The agent analyzes the signaling data on the probe due to the configured conditions (e.g. Called-number) and sends the results to the call trace application. The agent is configured by the call trace application and does not have an own user interface. The call trace application configures all connected agents and is responsible for the communication between the agents. The user interface of the call trace is served by the call trace application. The communication is realised with a standardized frame work which is basis for all applications.

Figure 11:
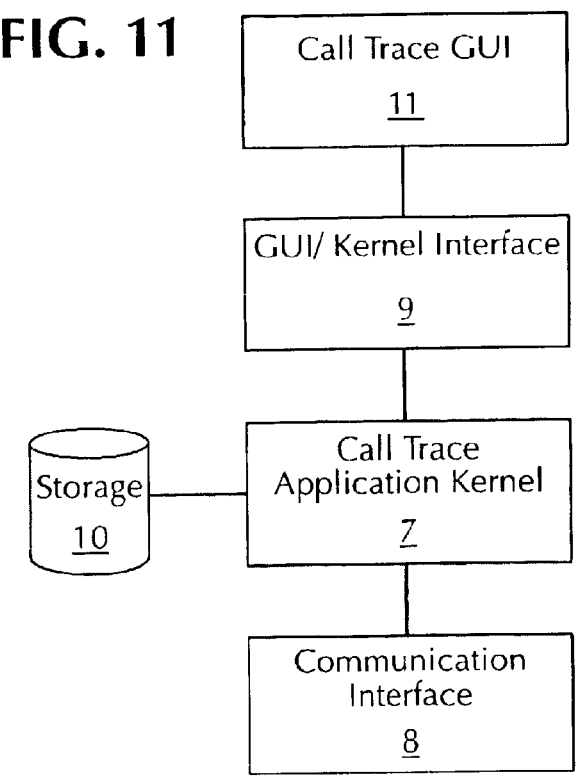
FIG. 11 the functional structure of the central server.

FIG. 11 shows the principle of the functional structure. The call trace application in the central server CS consists of call trace GUI 12, call trace application kernel 7, application/agent communication interface 8 and GUI/kernel interface 9. The call trace application controls all connected agents, provides the communication between agents and presents the results.

The call trace application kernel 7 configures all necessary agents due to the configuration (links, trigger events, call trace scenario parameters) selected by the user, communicates with call trace agents, provides communication between call trace agents, controls the call trace scenarios, stores results in data base, and transfers the trigger results to the user interface (call trace GUI).

Agent/application communication interface 8 is a message interface between call trace application kernel 7 and agents. Communication is performed via XDR packet.

For call trace a graphical user interface 12 is used to configure the call trace application kernel 7, to set the call trace parameters and to present the results. Communication between GUI 12 and application is performed using GUI/kernel interface 9. Result files and configurations are stored on a disc storage 10.

Further established is a dynamic time synchronization of the agent IA disabling the influence of processing time and timer supervision. The net wide call trace is an application of the SS#7 and Mobile Surveillance System. The system monitors all connected signalling links. All signalling data are stored onto disc where they are available for applications for about three days (depending on the size of the hard disc). The net wide call trace processes the data onto disc either online (e.g. data of the call may be received later) or offline (the whole call is already stored onto disc. In parallel other application may run on the system in parallel to the call trace. Therefore the incoming signalling traffic is asynchronous to the processing speed of the net wide call trace.

To avoid lost messages belonging to the call and to optimize the processing time it is essential that the pointer to the data in the files will be reset on each change of the status. In addition timer handling is used to stop a process if the expected data is not received in time.

Each data passed from the agents IA to the central server and vice versa contains a time stamp for correlation extracted by the actual signalling traffic. This time stamps correlate to the recorded data onto disc and are used for positioning the pointer to the file. The call trace uses the time stamp of the signalling traffic (network clock) to assure the recognition of all messages received which belong to the call.

E.g.

IAM messages are detected matching the trigger by more than one agent IA: All these agents IA inform the central cerver CS and pass the respective time stamp which will not have the same value (time is required to pass this IAM via several switches in the network).

CS takes the last time stamp received and distributes the routing labels with this time stamp to all agents.

The agents IA set the pointer to the data in the file with this time stamp. The succeeding messages of the call must be received after this pointer.

Advantages:

All messages are detected even if the processing time of the call trace is too high.

Optimization of the number of messages in the files to be processed. If the pointer is set too early many messages are decoded which cannot be part of this call.

Further established is a wait timer for status handling. The central server has to await the full reception of information from the intelligent agent IAs, e.g. the IAM is not received only once but several times by different intelligent agents IA. The certral server CS does not know in advance how many replies by the intelligent agents IA he will receive. Therefore a timer in the certral server CS is required for supervision of the replies.

The central server CS passes the trigger to the intelligent agents IA and enables the call trace. The central server CS expects the reception of the first establishment message by one of the intelligent agents IA. This action is not supervised by a timer.

If one of the intelligent agents IA returns the match of the trigger the central server CS starts a timer T1 expecting further replies. On each new reply by one of the intelligent agents IA the central server CS restarts T1. If T1 expires the central server CS stops awaiting replies and starts the distribution algorithms (s. chapter 1) to pass the routing information to the respective intelligent agents IA . If T1 expires the call trace assumes that either the call establish messages is routed completely or passed via not connected interfaces.

Entering traffic phase is not supervised

If one of the intelligent agents IA returns call termination the central server CS starts a timer T2 expecting further call termination from the intelligent agents IA. On each new reply by one of the intelligent agents IA the central server CS restarts T2. If T2 expires the central server CS stops awaiting replies and terminates all intelligent agents IA.

Advantages:

Optimization of the processing time

Avoids loosing data

Configurable for adaptation to different systems

For calls with long call duration an expiry timer is established. Especially if more than one call is detected with the same phone number (option of the call trace) a timer may be necessary to stop a call by the call trace application if it expires the max. call duration. The reason may be a lost call termination, e.g. if the links where the call was released were not traced.

The timer Td is started on entering the traffic status, call establishment is not affected If Td expires the central server CS terminates all intelligent agents IA without reception of the call related termination.

For handling of incomplete triggers (SAM and wild cards) as well as for handling of incomplete call termination the method provides diferrent procedural algorithms. The call trace application on the central server CS has not the knowledge of the number of digits which are required to complete the numbering. Therefore a tolerant algorithm is necessary to provide trigger match in case of ISUP SAM and wild cards. ISUP SAM is used to transfer digits after transmission of the IAM with begin of the phone number. The intelligent agent IA compares the digits transferred by IAM with the entered trigger. In case of wild cards only the entered digits are checked. If the trigger does not match but the IAM message indicates that SAM will follow the intelligent agent IA continues collecting the digits received with SAM messages and compares the whole number with the entered trigger. If the trigger matches the intelligent agent IA returns the routing label to the central server CS and the call trace is continued as usual.

Advantages:

Tolerant algorithm concerning the unpredictable time between IAM and SAM or between several SAM messages (subscriber dependent)

Combined with the algorithm described below the call trace may continue even if the first call trace don't match. E.g. if the last expected digit is not received (trigger does not match). The call trace is enabled for trigger match until a new establishment message is received with the same routing label.

Call termination is signalled using two messages: Release RL and Release complete RLC. If both messages are received by the activated intelligent agents IA the call trace is properly terminated. If one or both messages are not detected by the intelligent agents IA a termination algorithm is started.

Release is received by one or several intelligent agents IA. They inform the central server CS. The central server CS starts a timer T3. If this timer expires without reception of Release complete the manager terminates all activated intelligent agents IA.

Release is not received by an intelligent agent IA. Central server CS and intelligent agents IA continue awaiting for messages belonging to this call. If one of the intelligent agents IA receive a new call establishment message using the same routing label of the already established call the adequate intelligent agent IA passes the routing label to the central server CS. The central server CS terminates the old call on all activated intelligent agents IA. This algorithm is used in case of termination (no new call trace to be triggered for) and in case of starting a new call trace.

What is claimed is:

1. Method for net wide call trace of at least one call within a telecommunication network with various interfaces and protocol stacks by using a central call trace server (CS) and local intelligent call trace intelligent agents (IA) between the switching points (SP) of the telecommunication network, said central call trace server being connected with all of said local intelligent call trace intelligent agents (IA), with the following steps:

activating the intelligent agents (IA) by the central server (CS) together with a message comprising a trigger number (TN) to be call traced;

comparing the trigger number (TN) with the contents of the call establish messages of the calls running on a signaling channel (SC) by the intelligent agents (IA) and sending an establish message to the central server (CS) by those intelligent agents (IA) which have matched with the trigger number together with additional information (RL) about a detected connection between two switching points (SP) as well as at least an identification number of the intelligent agent (IA);

sorting the messages and information (RL) by the central server (CS) sent by the intelligent agents (IA), removing redundant information and allocating the information to a respective section belonging to two switching points (SP) being connected together.

tracing all signaling data belonging to the detected call by the intelligent agents (IA) being involved in view of the matching of the trigger (TN);

detecting the call terminating by at least one of said intelligent agents (IA) and sending a call termination message to the central server (CS), forwarding the message concerning the call termination to all the other intelligent agents (IA) being involved in the call trace; and transmitting the recorded data to the central server (CS) and displaying the data by the central server (CS) dependent on the different transmission layers in the telecommunication network.

2. Method according to claim 1 comprising informing said intelligent agents (IA) of said section between the switching points (SP) being not involved according to the topology of the telecommunication network about the detected connections;

selecting and activating those intelligent agents (IA) according to the topology of the telecommunication network being not involved which are arranged in the environment of the transmission path of the traced call.

3. Method according to claim 2 comprising activating those intelligent agents (IA) which are connected to a section between two switching points (SP), said section being connected at least to one switching point (SP) already detected in previous signaling data.

4. Method according to claim 2 comprising sending a new trigger number (TN) by the central server (CS) to the other intelligent agents (IA) in the environment of the switching points (SP) being involved in the transmission of the traced call, if one of the intelligent agents (IA) indicates a change of the original trigger in a new trigger.

5. Method according to claim 1, comprising extracting information about the transmission events in the traced signaling channel (TC) independent of the kind of the transmission protocol stack and sending this information to the central server (CS) by the respective intelligent agents (IA), sending said information to the other active intelligent agents (IA) for comparing with supervised calls, and communicating between the intelligent agents and the central server independent of the kind of the transmission protocol stack.

6. Method according to claim 1 comprising providing all data being transferred between the intelligent agents (IA) and the central server (CS) with a time stamp (TS);

recording the time stamp (TS) of the last received call establish message from the respective intelligent agent (IA) and distributing the information (RL) to the other intelligent agents (IA) with this time stamp (TS) by the central server (CS).

7. Method according to claim 6 comprising distributing the information with the last received time stamp (TS) of a call by the central server (CS) and setting the pointer to the data in the file with this time stamp by the intelligent agents (IA).

8. Method according to claim 6 comprising
starting a timer (T1) by the central server (CS) when receiving an establish message from an intelligent agent (IA), said timer having a preselected time period within which an establish message from the next intelligent agent (IA) has to be received by the central server (CS), and
sending information (RL) to all other intelligent agents (IA) and stopping awaiting replies after expiration of the preselected period by the central server (CS) which regards the messages as complete or the call as being passed via interfaces which are not connected for call trace.

9. Method according to claim 6 comprising
starting a timer (T2) by the central server (CS) when receiving a call termination message from an intelligent agent (IA) and restarting the timer when receiving the next call termination message, said timer having a preselected time period within which a call termination message from the next intelligent agent (IA) has to be received by the central server (CS), and
informing all intelligent agents (IA) being involved in the call trace by the central server (CS) about the call termination after expiration of the preselected time period.

10. Method according to claim 6 comprising
starting a timer (Td) by the central server (CS) when entering traffic status, said timer having a preselected time period for maximum call duration, and
terminating the call trace and information of the involved intelligent agents (IA) by one of exceeding the maximum call duration and detecting a further call having the same call information (RL).

11. Method according to claim 1 comprising
sending a signaling message in several subsequent messages,
collecting the subsequent messages following the signaling message and comparing with the trigger number (TN) by the intelligent agents (IA); and
sending the establish message by the intelligent agents (IA) to the central server (CS) in case of matching with the trigger number (TN).

12. Method according to claim 1 comprising
sending a message by at least one of the intelligent agents (IA) to the central server (CS) in case that the respective intelligent agent (IA) has detected a first call termination signal (RL);
starting a timer (T3) by the central server (CS) after having received the message from the intelligent agent (IA), said timer having a preselected time period within which a second call termination signal (RLC) is expected from the intelligent agent (IA) by the central server (CS); and
terminating all the involved intelligent agents (IA) by the central server (CS) at latest after the expiration of the preselected time period.

13. Method according to claim 1 comprising
terminating the call trace by the central server (CS) in case that one of the intelligent agents (IA) sends a new establish message with the accompanying parameters which complies with call information (RL) of the already traced call.

14. Arrangement for net wide call trace of at least one call with a telecommunication network comprising a central call trace server (CS) and local call trace intelligent agents (IA) between the switching points (SP) of the telecommunication network, said central call trace server (CS) being connected with all of said local call trace intelligent agents (IA) and comprising a call trace managing means with a call trace graphical user interface (GUI) and an interface connected to said intelligent agents (IA), and said intelligent agents (IA) comprise an interface to the central server (CS) and an intelligent call trace unit (IU), said central server (CS) and intelligent agents (IA) being operative to communicate with each other and to perform the following operations:
activating the intelligent agents (IA) by the central server (CS) together with a message comprising a trigger number (TN) to be call traced;
comparing the trigger number (TN) with the call establish messages of the calls running on the signaling channel (SC) by the intelligent agents (IA) and sending an establish message to the central server (CS) by those intelligent agents (IA) which have matched with the trigger number together with additional information (RL) about a detected connection between two switching points (SP) as well as at least an identification number of the intelligent agent (IA);
sorting the messages and information (RL) by the central server (CS) sent by the intelligent agents (IA), removing redundant information and allocating the information to a respective section belonging to two switching points (SP) being connected together;
tracing all signaling data of the signaling channel (SC) by the intelligent agents (IA) being involved in view of the matching of the trigger number (TN) and transmitting the call relevant data to the central server (CS);
detecting the call terminating by at lest one of said intelligent agents (IA) and sending a respective message to the central server (CS), forwarding the message concerning the call termination to all the other intelligent agents (IA) being involved in the call trace; and
transmitting the signaling data of the call from the intelligent agents (IA) to the central server (CS) and displaying the stored data by the central server (CS) dependent on the different transmission layers in the telecommunication network.

15. Arrangement according to claim 14 being operative to perform
informing said intelligent agents (IA) of said section between the switching points (SP) being not involved according to the topology of the telecommunication network about the detected connections;
selecting and activating those intelligent agents (IA) according to the topology of the telecommunication network being not involved which are arranged in the environment of the transmission path of the traced call.

16. Arrangement according to claim 15 being operative to perform
activating those intelligent agents (IA) which are connected to a section between two switching points (SP), said section being connected at least to one switching point (SP) already detected in previous signaling data.

17. Arrangement according to claim 14 being operative to perform
sending a new trigger (TN) by the central server (CS) to the other intelligent agents (IA) in the environment of the switching points (SP) being involved in the transmission of the traced call, if one of the intelligent agents (IA) indicates a change of the original trigger number in a new trigger number.

18. Arrangement according to claim 14 being operative to perform extracting information about the transmission events in the traced signaling channel (SC) independent from the kind of the transmission protocol and sending this information to the central server (CS) by the respective intelligent agents (IA), and sending this information to the other active intelligent agents (IA) for comparing with the supervised calls.

19. Arrangement according to claim 14 operative to perform providing all data being transferred between the intelligent agents (IA) and the central server (CS) with a time stamp (TS);

recording the time stamp (TS) of the last received message from the respective intelligent agent (IA) and distributing the information (RL) to the other intelligent agents (IA) with this time stamp (TS) by the central server (CS).

20. Arrangement according to claim 19 being operative to perform distributing the information with the last received time stamp (TS) of a call by the central server (CS) and setting the pointer to the data in the file with this time stamp by the intelligent agents (IA).

21. Arrangement according to claim 19 being operative to perform starting a timer (T1) by the central server (CS) always when receiving an establish message from an intelligent agent (IA), said timer having a preselected time period within which an establish message from the next intelligent agent (IA) has to be received by the central server (CS), and sending information (RL) to all other intelligent agents (IA) and stopping awaiting replies after expiration of said preselected time period by the central server (CS) which regards the messages as complete or the call as being passed via interfaces which are not connected for call trace.

22. Arrangement according to claim 19 being operative to perform starting a timer (T2) by the central server (CS) when receiving a call termination message from an intelligent agent (IA) and restarting the timer when receiving the next call termination message, said timer having a preselected time period within which a call termination message from the next intelligent agent (IA) has to be received by the central server (CS), and informing all intelligent agents (IA) being involved in the call trace by the central server (CS) about the call termination after expiration of the preselected time period.

23. Arrangement according to claim 19 being operative to perform starting a timer (Td) by the central server (CS) when entering the traffic status, said timer having a preselected time period for maximum call duration, and terminating the call trace and information of the involved intelligent agents (IA) by at least one of exceeding the maximum call duration and by detecting a further call having the same call information (RL).

24. Arrangement according to claim 14 being operative to perform sending a signaling message in several subsequent messages;

collecting the subsequent messages following the signaling message and comparing with the trigger number (TN) by the intelligent agents (IA); and sending the establish message by the intelligent agents (IA) to the central server (CS) in case of matching with the trigger number (TN).

25. Arrangement according to claim 14 being operative to perform sending a message by at least one of the intelligent agents (IA) to the central server (CS) in case that the respective intelligent agent (IA) has detected a first call termination signal (RL);

starting a timer (T3) by the central server (CS) after having received the message from the intelligent agent (IA), said timer having a preselected time period within which a second call termination signal (RLC) is expected from the intelligent agent (IA) by the central server (CS); and terminating all the involved intelligent agents (IA) by the central server (CS) at latest after the expiration of the preselected time period.

26. Arrangement according to claim 14 being operative to perform terminating the call trace by the central server (CS) in case that one of the intelligent agents (IA) sends a new establish message with the accompanying parameters which complies with trigger number (TN) of the already traced call.

* * * * *